(12) United States Patent
Chang et al.

(10) Patent No.: US 7,133,448 B2
(45) Date of Patent: Nov. 7, 2006

(54) METHOD AND APPARATUS FOR RATE CONTROL IN MOVING PICTURE VIDEO COMPRESSION

(75) Inventors: Yung-Ching Chang, Kaohsiung Hsien (TW); Jo-Tan Yao, Taipei Hsien (TW); Kuo-Ping Hsu, Taipei Hsien (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 803 days.

(21) Appl. No.: 10/289,394

(22) Filed: Nov. 7, 2002

(65) Prior Publication Data

US 2004/0091045 A1 May 13, 2004

(51) Int. Cl.
*H04N 7/12* (2006.01)
*H04B 1/66* (2006.01)

(52) U.S. Cl. .............................. 375/240.03
(58) Field of Classification Search ........... 375/240.15, 375/240.03, 240.04, 240.16, 240.12; H04B 1/66; H04N 7/12

See application file for complete search history.

(56) References Cited

U.S. PATENT DOCUMENTS 6,600,783 B1 * 7/2003 Morita et al. .......... 375/240.03

2002/0118752 A1 * 8/2002 Oami ...................... 375/240.12
2004/0202247 A1 * 10/2004 Chang et al. ........... 375/240.03
2004/0233984 A1 * 11/2004 Chang et al. ........... 375/240.03
2004/0234142 A1 * 11/2004 Chang et al. ............... 382/236

FOREIGN PATENT DOCUMENTS

CN 1278692 A 1/2001

* cited by examiner

*Primary Examiner*—Tung Vo
(74) *Attorney, Agent, or Firm*—Birch, Stewart, Kolasch & Birch, LLP

(57) ABSTRACT

A total activity measure for a current picture to be encoded in a set of consecutive pictures of a video sequence is calculated first. Based on the total activity measure of the current picture and an activity-to-complexity ratio of a previously encoded picture of the same type in the set of consecutive pictures, a complexity measure of the current picture is estimated. With the estimated complexity measure of the current picture, an instantaneous complexity measure for the set of consecutive pictures is updated. A target bit budget is allocated to the current picture depending on the estimated complexity measure and the instantaneous complexity measure. The current picture is encoded according to the target bit budget, and the activity-to-complexity ratio for the current picture is computed based on the total activity, actual bits consumed by the current picture, and the average quantization step size of the current picture.

11 Claims, 4 Drawing Sheets

METHOD AND APPARATUS FOR RATE CONTROL IN MOVING PICTURE VIDEO COMPRESSION

FIELD OF THE INVENTION

The present invention relates generally to the field of data compression and, in particular, to a method and system for performing rate control for a video encoder.

BACKGROUND OF THE INVENTION

It is practically a cliche presently to claim that all electronic communications is engaged in a digital revolution. The main advantage of digital representation of information is the robustness of the bitstream. It can be stored and recovered, transmitted and received, processed and manipulated, all virtually without error. For example, the NTSC color video image has 29.97 frames per second; approximately 480 visible scan lines per frames; and requires approximately 480 pixels per scan line in red, green, and blue color components. However, if each color component is coded using 8 bits, the bitrate produced is ≈168 Megabits per second (Mbits/s). The raw uncompressed bitrates for various video formats are very high and are not economical in many applications.

Digital audio and video signals integrated with computers, telecommunication networks, and consumer products, are poised to fuel the information revolution. At the heart of this revolution is the digital compression of audio and video signals. Several of the compression standards involve algorithms based on a common core of compression techniques, e.g., the ITU-T (formerly CCITT) Recommendation H.261 and ITU-T Recommendation H.263, and the ISO/IEC MPEG-1, MPEG-2 and MPEG-4 standards. The MPEG algorithms were developed by the Moving Picture Experts Group (MPEG), part of a joint technical committee of the International Standards Organization (ISO) and the International Electrotechnical Commission (IEC). The MPEG committee develops standards for the multiplexed, compressed representation of video and associated audio signals. The standards specify the syntax of the compressed bitstream and the method of decoding, but leave considerable latitude for novelty and variety in the algorithm employed in the encoder.

In MPEG, a sequence of video pictures is typically divided into a series of GOPs, where each GOP (Group of Pictures) begins with an Intra-coded picture (I-picture) followed by an arrangement of Forward Predictive-coded pictures (P-pictures) and Bidirectionally Predicted pictures (B-pictures). FIG. 1 illustrates a typical GOP in display order. I-pictures are coded without reference to preceding or upcoming pictures in the sequence. P-pictures are coded with respect to the temporally closest preceding I-picture or P-picture in the sequence. B-pictures are interspersed between the I-pictures and P-pictures in the sequence, and coded with respect to the immediately adjacent I- and P-pictures either preceding, upcoming, or both. Even though several B-pictures may occur in immediate succession, B-pictures may never be used to predict another picture.

Each picture has three components: luminance (Y), red color difference (Cr), and blue color difference (Cb). For an MPEG-2 4:2:0 format, the Cr and Cb components each have half as many samples as the Y component in both horizontal and vertical directions. As depicted in FIG. 2, the basic building block of an MPEG picture is the macroblock (MB). For 4:2:0 video, each MB consists of a 16×16 sample array of luminance samples together with one 8×8 block of samples for each of two color difference components. The 16×16 sample array of luminance samples is actually composed of four 8×8 blocks of samples.

It is the responsibility of an encoder to decide which picture coding type and which prediction mode is best. In an I-picture, each 8×8 block of pixels in a MB undergoes a discrete cosine transform (DCT) to form a 8×8 array of transform coefficients. The transform coefficients are then quantized with a quantizer matrix. The resulting quantized DCT coefficients are zig-zag scanned to form a sequence of DCT coefficients. The sequence of DCT coefficients are then encoded using a variable length code (VLC). In a P-picture, a decision is made to code each MB as an I macroblock, or to code the MB as a P macroblock. The I macroblock is encoded according to the technique described above. For each P macroblock, a prediction of the macroblock in a preceding picture is obtained. The prediction is identified by a motion vector indicating the translation between the macroblcok to be coded in the current picture and its prediction in the previous picture. The predictive error between the predictive macroblock and the current macroblock is then coded using the DCT, quantization, zig-zag scanning, and VLC encoding.

In the encoding of a B-picture, a decision has to be made as to the coding of each MB. There are four macroblock modes, intra (I) mode, forward (F) mode, backward (B) mode, and interpolative forward-backward (FB) mode. I mode is intracoding using no motion compensation (as in an I macroblock). F mode is unidirectional forward predictive coding using a previous picture to obtain a motion compensated prediction (as in a P macroblock). Conversely, B mode is unidirectional backward predictive coding using a subsequent picture to obtain a motion compensated prediction. In particular, FB mode is bidirectional predictive coding, wherein a motion compensated prediction is obtained by interpolating a backward motion compensated prediction and a forward motion compensated prediction. In the cases of F, B and FB macroblock modes, the predictive error is encoded using the DCT, quantization, zig-zag scanning, and VLC encoding.

The encoder must choose quantization step sizes for an entire picture so as to control visible distortion for a given bitrate. Note that the actual bits used for encoding a picture with chosen quantization step sizes are unknown until the picture is actually coded. There does not exist an inverse function that can determine the actual used bits of a picture by simply given desired quantization step sizes. Therefore, an important aspect of any video encoder is rate control. The purpose of rate control is to maximize the perceptual quality of the encoded video when it is decoded at a decoder by intelligently allocating the number of bits used to encode each picture and each MB within a picture. Nevertheless, conventional methods for rate control are relatively complex, typically requiring multiple passes to accomplish video encoding.

Accordingly, what is needed is a novel rate control technique for a single-pass, real time video encoder. Further, it is desired to provide a method and apparatus for frame-level rate control in moving picture video compression.

SUMMARY OF THE INVENTION

In accordance with the present invention, the algorithm of target bit allocation for each picture is based on coding results of previous pictures and pre-analyzed activity of current picture to be encoded. Moreover, with the relationship between pre-analyzed activity of current picture and actual complexity of previously coded picture, the complexity of the current picture can be estimated. Since the picture's complexity measure contains quality information after coding the picture, such an estimated complexity measure of the current picture is very useful for an encoder to allocate bit budget to each picture more precisely in order to achieve uniform perceptual quality from picture to picture in a video sequence.

The present invention is generally directed to a method for rate control in moving picture video compression. In accordance with one aspect of the invention, a total activity measure for a current picture to be encoded is calculated first, in which the current picture is in a set of consecutive pictures of a video sequence. Based on the total activity measure of the current picture and an activity-to-complexity ratio of a previously encoded picture of the same type in the set of consecutive pictures, a complexity measure of the current picture is therefore estimated. In addition, an instantaneous complexity measure for the set of consecutive pictures is updated with the estimated complexity measure of the current picture. Hence, a target bit budget can be allocated to the current picture depending on not only its estimated complexity measure but also the instantaneous complexity measure. Accordingly, the current picture in the video sequence is encoded based on the allocated target bit budget. After encoding the current picture, the activity-to-complexity ratio for the current picture is computed based on the total activity, actual bits consumed by the current picture, and an average quantization step size of the current picture. In this regard, the activity-to-complexity ratio of the current picture varies directly with the total activity and inversely with the actual consumed bits and the average quantization step size of the current picture.

In another aspect of the invention, an apparatus for rate control in a moving picture video encoder is disclosed. The apparatus for rate control includes a motion estimation unit, a complexity estimator, a target allocator and a parameter updater. The motion estimation unit is configured to receive a current picture to be encoded in a set of consecutive pictures of a video sequence, and it is provided to calculate a total activity measure for the current picture to be encoded while performing block matching for motion estimation. The complexity estimator is used to estimate a complexity measure of the current picture based on the total activity of the current picture and an activity-to-complexity ratio of a previously encoded picture of the same type in the set of consecutive pictures. With the estimated complexity measure of the current picture, the target allocator updates an instantaneous complexity measure for the set of consecutive pictures. Also, the target allocator allocates a target bit budget to the current picture depending on the estimated complexity measure and the instantaneous complexity measure. Based on the total activity measure, actual bits consumed by the current picture and the average of quantization step sizes for the current picture, the parameter updater computes the activity-to-complexity ratio for the current picture.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and in which.

DETAILED DESCRIPTION OF THE INVENTION

Figure 1:
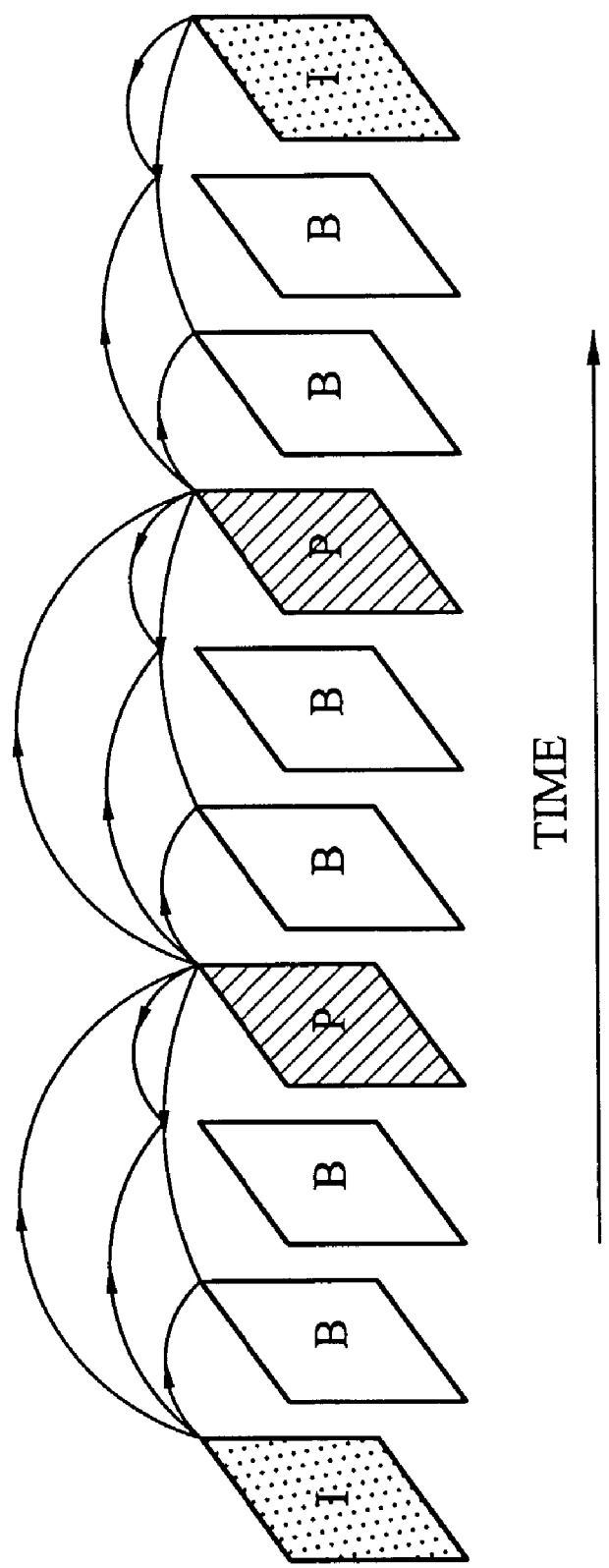
FIG. 1 shows a typical group of pictures in display order.
Figure 2:
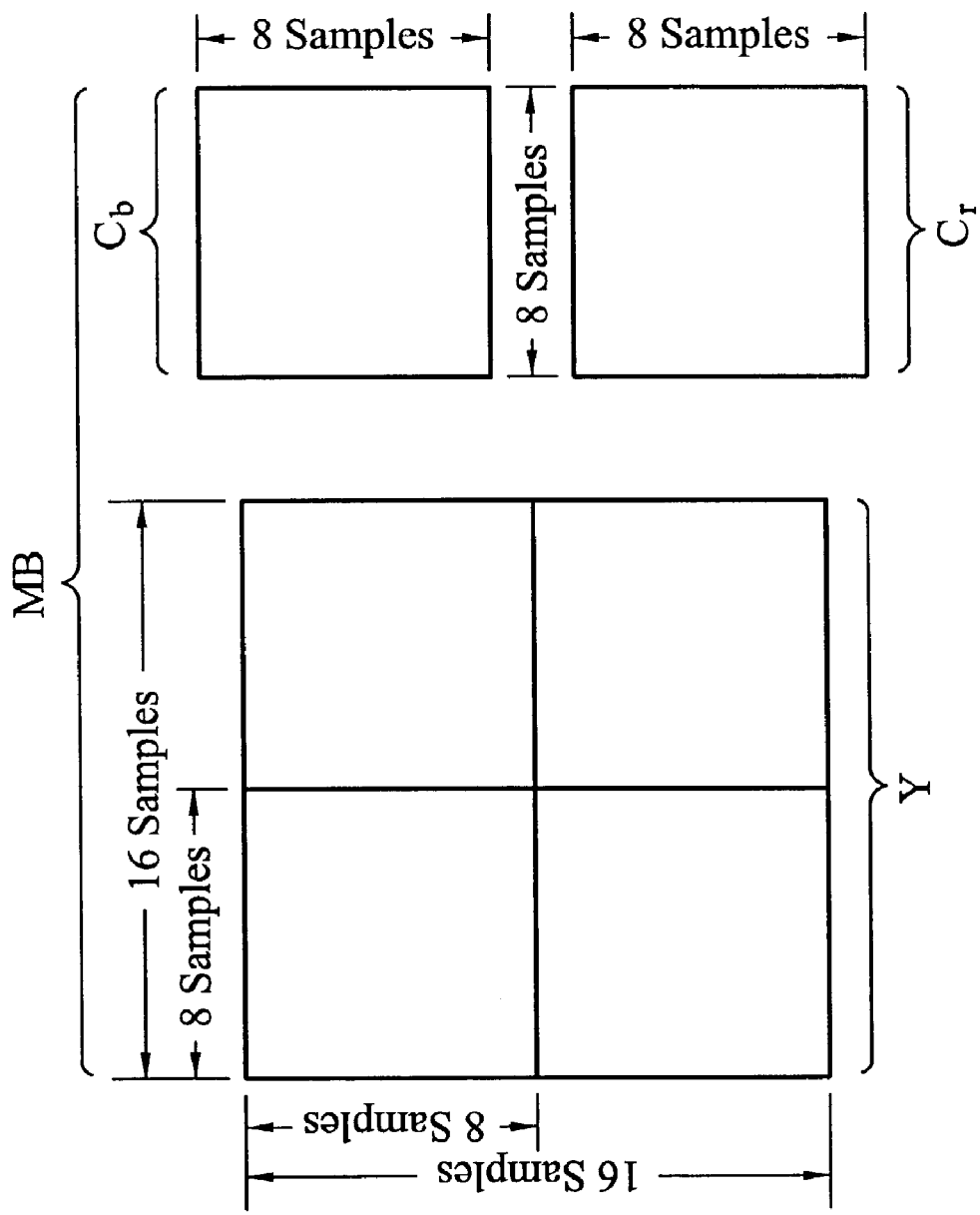
FIG. 2 shows the MPEG macroblock.

To begin with, it should be understood that I- and P-pictures used for prediction must be decoded in an MPEG encoder. With calculation of the root mean square error (RMS) between the original picture and the decoded picture, an objective quality measure for the decoded picture is obtained. Let the RMS be the distortion measure of the decoded picture, a complexity measure C is defined for the decoded picture as follows:

$$C = r \times d$$

where r is the bitrate required to encode the picture and d is the distortion measure of the decoded picture. In theory, the relationship between average quantization step size and distortion is proportionality. Thus, the complexity measure C of the picture can be defined as:

$$C \approx \frac{r \times q}{2}$$

where q is the average quantization step size for the picture. The bitrate (actual used bits) and the average quantization step size can both be obtained after encoding a picture. Therefore, the complexity measure of this picture is also known.

Picture complexity depends on the nature of the picture itself and the coding type of the picture. Prior arts utilize the complexity measure of recent coded pictures to represent the complexity measure for the current picture and keep three complexity measures respectively for I-, P- and B-pictures to reduce the effects of different coding types. This achieves a reasonably good performance if variations in picture contents of a video sequence are smooth. However, it is not suitable for a video sequence with large content variations because there exists a mismatch between target bit allocation and actual used bits required for encoding a picture to achieve uniform perceptual quality.

With the relationship between pre-analyzed activity of current picture and actual complexity of previously coded picture, the complexity of the current picture can be estimated in accordance with the invention. The activity is an attempt to measure bitrate and quality of a picture after encoding. Assuming that a total activity measure A for an entire picture is proportional to the complexity measure C.

Thus:

$$A = k \times C \approx \frac{k}{2} \times r \times q = k' \times r \times q$$

where k is a proportionality constant. Let k' be the activity-to-complexity ratio (ACR), the total activity measure A can also be represented by the following equation:

$$A = ACR \times r \times q$$

According to the invention, ACR is predicted from the previously encoded picture of the same type. Conceptually, the total activity A of a picture is calculated before coding the picture. Then $C_{est}^{(i)}$, the complexity measure for a picture $P^{(i)}$ to be encoded is estimated as follows:

$$C_{est}^{(i)} = \frac{A^{(i)}}{ACR^{(i-1)}}$$

where $A^{(i)}$ is the total activity of the picture $P^{(i)}$ and $ACR^{(i-1)}$ is the activity-to-complexity ratio of the previously encoded picture of the same type. Hereinafter the superscript (i) in a symbol or variable indicates that the symbol or variable is associated with the current picture to be encoded. Similarly, the superscript (i−1) in a symbol or variable refers to the previously encoded picture.

The estimated complexity measure $C_{est}^{(i)}$ is used to update the complexity measure for the picture of the appropriate type. Note that the complexity measures of the three types of pictures $C_I$, $C_P$ and $C_B$ are stored for the following manipulations. An instantaneous complexity measure INST_C for a set of consecutive pictures is also updated as follows:

$$INST\_C = N_I \times C_I + N_P \times C_P + N_B \times C_B$$

where $N_I$, $N_P$ and $N_B$ are numbers of I-, P- and B-pictures in the set of consecutive pictures. The set of consecutive pictures consists of at least a GOP. Once the instantaneous complexity measure INST_C has been determined, the target bit budget $TB^{(i)}$ for the current picture $P^{(i)}$ is then given by:

$$TB^{(i)} = \frac{C_{est}^{(i)}}{INST\_C} \times R_{eff}$$

where $R_{eff}$ is the effective bit usage in the set of consecutive pictures. The target bit budget $TB^{(i)}$, as such, is proportional to the complexity measure $C_{est}^{(i)}$ and inversely proportional to the instantaneous complexity measure INST_C.

All MPEG-2 bitstreams are required to comply with the Video Buffer Verifier (VBV) rules described in the MPEG-2 standard. The allocated target is limited such that the VBV buffer does not underflow or overflow. When the target bit budget for the current picture is determined, many different types of picture coders, such as the one described in Test Model 5 of MPEG-2, can be implemented to compress the picture according to the target bit budget.

After completing the encoding of the current picture, the actual complexity measure is known and the relationship between the total activity measure and the actual complexity measure for the current picture, $ACR^{(i)}$, is calculated from $$ACR^{(i)} = \frac{A^{(i)}}{AQ^{(i)} \times UB^{(i)}}$$

in which $ACR^{(i)}$ varies directly with the total activity $A^{(i)}$, and varies inversely with the actual consumed bits $UB^{(i)}$ and the average quantization step size of the current picture, $AQ^{(i)}$. This $ACR^{(i)}$ is used to predict the complexity measure of a next picture of the same type. Note that $ACR^{(i)}$ can be linearly combined with $ACR^{(i-1)}$ to avoid the impact of a noisy picture.

Figure 3:
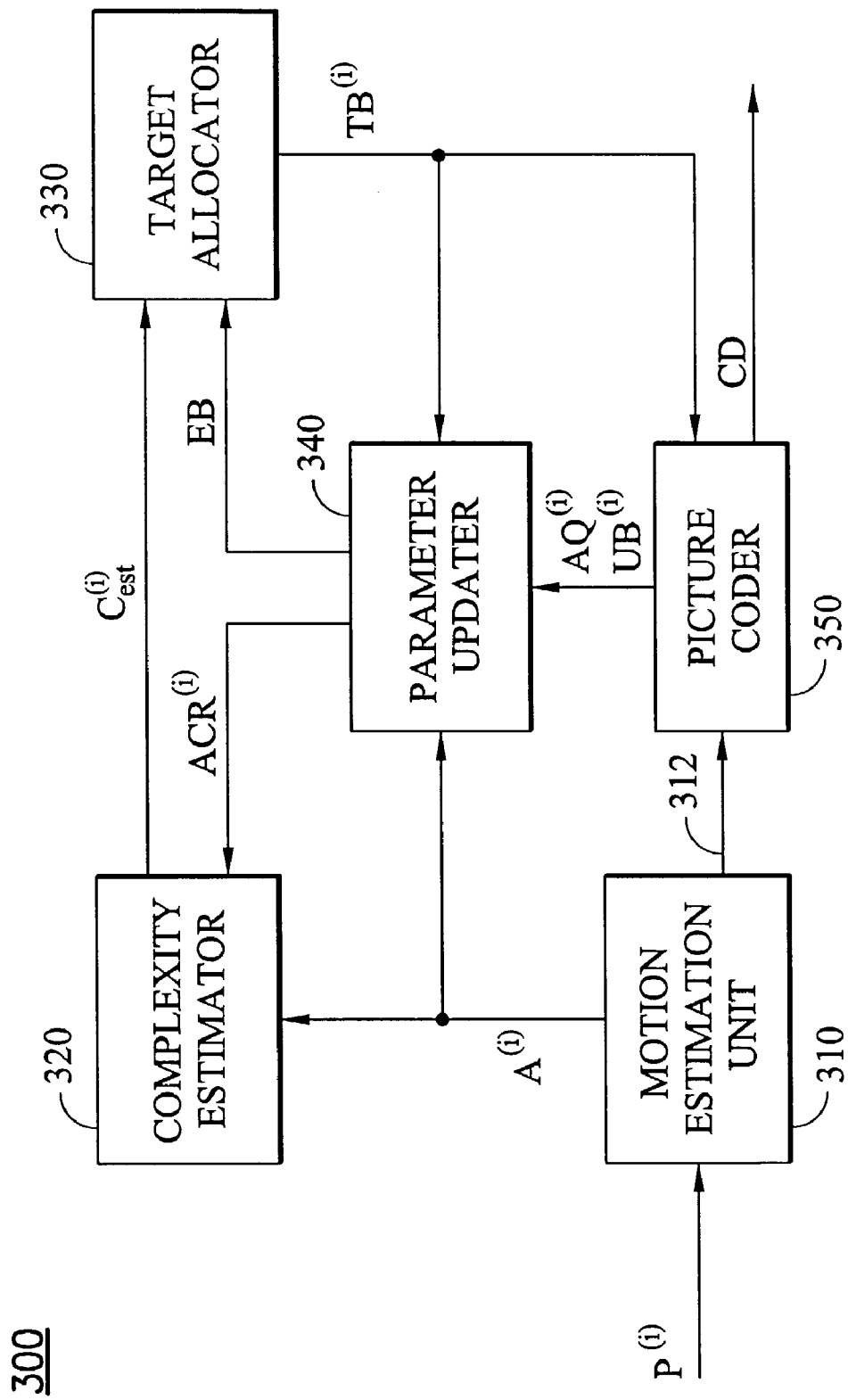
FIG. 3 shows a block diagram illustrating an apparatus for rate control in accordance with a preferred embodiment of the invention.
Figure 4:
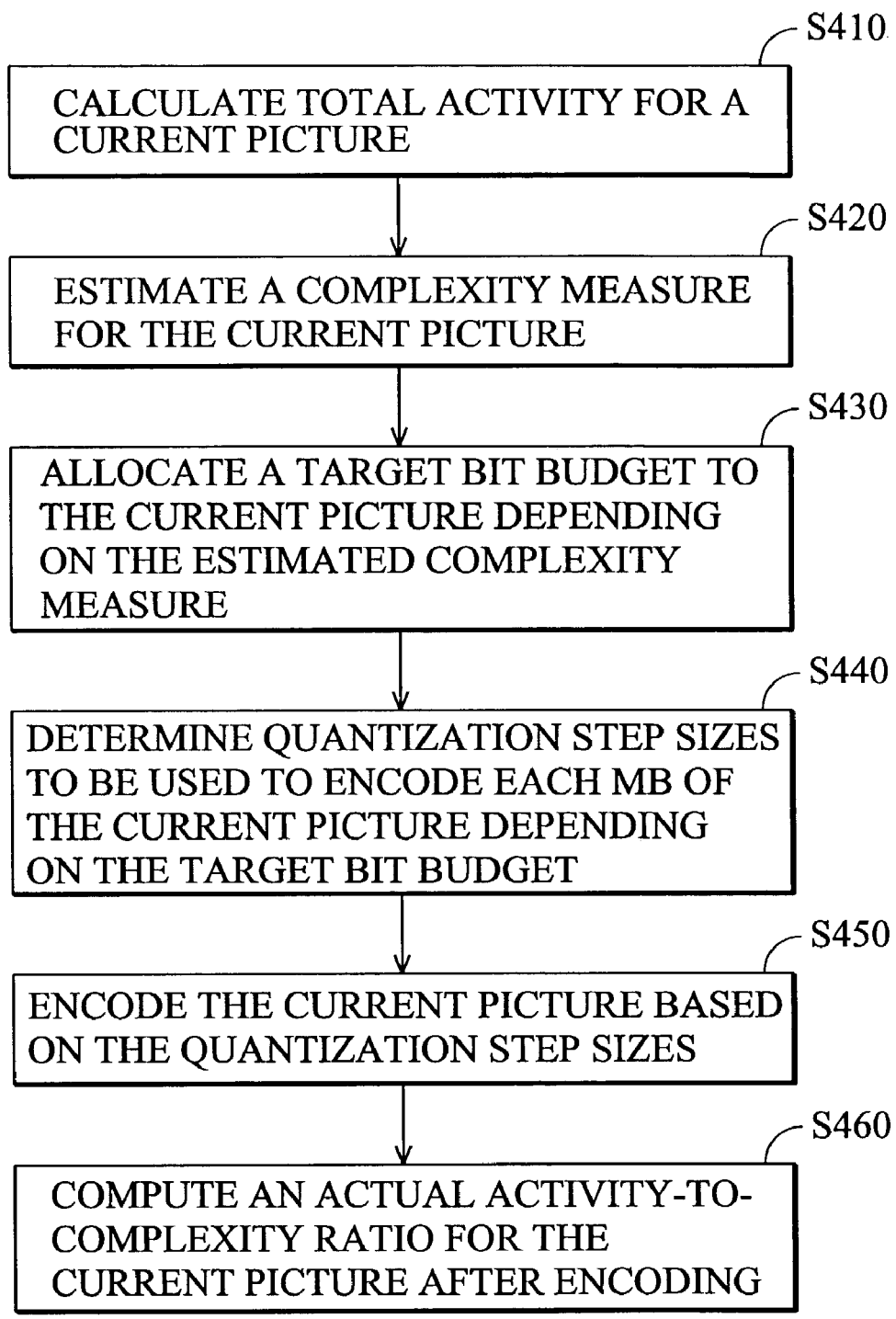
FIG. 4 shows an operational flowchart in accordance with the invention.

A single-pass video encoding of the invention will be explained from a preferred embodiment of FIG. 3 in conjunction with the accompanying operational flowchart of FIG. 4. As depicted in FIG. 3, moving picture video encoder 300 includes a motion estimation unit 310, a complexity estimator 320, a target allocator 330, a parameter updater 340 and a picture coder 350. The motion estimation unit 310 is configured to receive a picture $P^{(i)}$ in a set of consecutive pictures of a video sequence. The motion estimation unit 310 calculates a total activity $A^{(i)}$ for the current picture $P^{(i)}$ while performing block matching for motion estimation (step S410). The complexity estimator 320 is used to estimate a complexity measure $C_{est}^{(i)}$ based on the total activity $A^{(i)}$ and an activity-to-complexity ratio $ACR^{(i-1)}$ of a previously encoded picture of the same type in the set of consecutive pictures (step S420). Depending on the estimated complexity measure $C_{est}^{(i)}$, the target allocator 330 allocates a target bit budget $TB^{(i)}$ to the current picture $P^{(i)}$ (step S430). The picture coder 350 therefore determines the quantization step sizes to be used to encode each spatial region, e.g., macroblock, of the current picture $P^{(i)}$ depending on the target bit budget $TB^{(i)}$ (step S440). In accordance with the quantization step sizes, the picture coder 350 encodes the current picture $P^{(i)}$ (step 450) and returns the actual consumed bits $UB^{(i)}$ and the average quantization step size $AQ^{(i)}$ to the parameter updater 340. Based on the total activity $A^{(i)}$, the actual consumed bits $UB^{(i)}$ and the average quantization step size $AQ^{(i)}$, the parameter updater 340 computes the activity-to-complexity ratio, $ACR^{(i)}$, for the current picture $P^{(i)}$ (step S460).

It is contemplated that the preferred embodiment may be implemented equivalently in hardware and/or software. According to the invention, the motion estimation unit 310 and the other functional blocks of FIG. 3 may operate in a pipeline mode. The motion estimation unit 310 must finish motion estimation and total activity calculation for the current picture to be encoded before the complexity estimator 320 starts to calculate the complexity measure for the picture. Furthermore, the complexity estimator 320 and the rest of the functional blocks are still busy finishing all the operations related to the current picture while the motion estimation unit 310 prepares for the next picture. Each block of the preferred embodiment will be described in detail below.

One of the primary purpose of the motion estimation unit 310 is to determine which prediction mode will be used to code each MB in a picture, and if necessary, to carry out forward and backward motion estimation. The motion estimation unit 310 also extracts picture activity information from the block matching operation. First, the intra-activity for each MB is calculated. Denoting the pixel intensities of the four 8×8 luminance blocks in a MB by $Y_{m,n}$, m=0, ..., 7, n=0, ..., 7, and the average value of each 8×8 block by $\overline{Y}$. Then, the intra-activity IntraAct for each MB is calculated from $$IntraAct = \sum_{k=0}^{3} \sigma_k$$

where $$\sigma_k = \sqrt{\sum_{m=0}^{7} \sum_{n=0}^{7} (Y_{m,n} - \overline{Y})^2}$$

If lower computational complexity is required, the intra-activity IntraAct for each MB is taken to be the absolute difference from $\overline{Y}$ instead, and is given by:

$$IntraAct = \sum_{k=0}^{3} \Delta_k$$

where $$\Delta_k = \sum_{m=0}^{7} \sum_{n=0}^{7} |Y_{m,n} - \overline{Y}|$$

Since there is only one mode for MBs in I-pictures: I mode, the IntraAct becomes activity measure of each MB for I-pictures.

If the picture is a P-picture or B-picture, motion estimation should be performed. Block matching techniques are commonly used for finding motion vectors that are the best. For nonintra coding (P- and B-pictures), prediction with forward, backward, bidirectional, or no motion compensation can be selected by minimizing a distortion criterion such as variance or sum of absolute distortions. Once a macroblock mode for each MB in a P- or B-picture has been determined, the variances of four 8×8 blocks in each motion-compensated difference MB are also obtained. Note that the motion compensated difference MB is the pixel-wise difference between the MB under consideration and the prediction MB. The sum of absolute distortions, which is usually computationally more efficient, is used in place of the variance. The variances or sums of absolute distortions of four 8×8 blocks are added together to obtain the inter-activity InterAct for each MB in nonintra coded pictures. Then for each MB in the nonintra coded pictures, its InterAct is compared to its IntraAct so as to determine whether the InterAct is the smaller one. If so, the InterAct is the activity measure for that MB and the MB is coded with the inter-mode; otherwise, the IntraAct is the activity measure for that MB and the MB is coded with the intra-mode. Finally, a total activity measure $A^{(i)}$ may be obtained by summing the activity measures for all the MBs in current I-, P- or B-picture The motion estimation unit 310 sends the total activity $A^{(i)}$ to the complexity estimator 320 and the parameter updater 340.

The complexity estimator 320 then estimates the complexity measure for the current picture $P^{(i)}$ of a particular type. Moreover, weighting factors are introduced into the estimated complexity measure $C_{est}^{(i)}$ depending on the three picture types. Because B-pictures may never be used to predict another, the weighting factor for B-picture is reduced thereby allocating fewer bits to B-pictures and reserving bits for I- and P-pictures. Typically, the coding of I-pictures results in the most bits, so the weighting factor for P-picture is smaller than that of I-picture. Depending on the type of the current picture, the complexity estimator 320 updates only one of the three complexity measures, $C_I$, $C_P$ or $C_B$. The complexity measure for the current picture $P^{(i)}$ is given by:

if (I-picture)

$$C_{est}^{(i)} = C_I = K_I \times \frac{A^{(i)}}{ACR_I^{(i-1)}}$$

else if (P-picture)

$$C_{est}^{(i)} = C_P = K_P \times \frac{A^{(i)}}{ACR_P^{(i-1)}}$$

else if (B-picture)

$$C_{est}^{(i)} = C_B = K_B \times \frac{A^{(i)}}{ACR_B^{(i-1)}}$$

where $ACR_I^{(i-1)}$, $ACR_P^{(i-1)}$ and $ACR_B^{(i-1)}$ denote the activity-to-complexity ratios for previously encoded pictures of picture types I, P and B in a set of consecutive pictures, respectively. These $ACR_I^{(i-1)}$, $ACR_P^{(i-1)}$ and $ACR_B^{(i-1)}$ are stored in the parameter updater 340, and the activity-to-complexity ratio for the previous picture of the appropriate type is read by the complexity estimator 320. The $K_I$, $K_P$ and $K_B$ are weighting factors for I-, P- and B-pictures respectively, typically ranging from 0 to 1.0. In the case of I-pictures, a value of $K_I=1.0$ may be used in the preferred embodiment.

Upon receipt of the $C_{est}^{(i)}$, the target allocator 330 then updates an instantaneous complexity measure INST_C for the set of consecutive pictures and allocates the target bit budget $TB^{(i)}$ to the picture $P^{(i)}$. The instantaneous complexity measure INST_C is updated as follows:

$$INST\_C = N_I \times C_I + N_P \times C_P + N_B \times C_B$$

where $N_I$, $N_P$ and $N_B$ are numbers of I-, P- and B-pictures in the set of consecutive pictures. Also, the target bit budget $TB^{(i)}$ for the current picture $P^{(i)}$ is calculated from $$TB^{(i)} = \frac{C_{est}^{(i)}}{INST\_C} \times \frac{n}{f} \times R$$

where n is the number of pictures in the set of consecutive pictures, f is the number of pictures per second (i.e., the frame rate), and R is the desired average bitrate for each set of consecutive pictures. However, the actual consumed bits will not exactly match expected bit budget. A feedback strategy has been developed to keep the actual bit consumed by the picture close to the target bit allocation. In the preferred embodiment, the current picture being coded amortizes a portion of excess bits encoded so far. Then, $$TB^{(i)} = TB^{(i)} - AR \times EB$$

where EB is the excess bits passed from the parameter updater 340 and AR is a predefined amortization rate, typically ranging from 0.05 to 0.2. The target allocator 330 should adjust the target bit budget $TB^{(i)}$ to conform to the Video Buffer Verifier (VBV), so upper (U_bound) and lower (L_bound) boundaries on the budget are also determined. The target bit budget is allocated to a picture such that the VBV buffer does not overflow or underflow in the case of constant bitrate (CBR) operation. Therefore, target bit budget $TB^{(i)}$ is clamped to be within the boundaries:

if $(TB^{(i)} > U\_bound)$ then $TB^{(i)} = U\_bound$ if $(TB^{(i)} < L\_bound)$ then $TB^{(i)} = L\_bound$ For variable bitrate (VBR) operation, it is only necessary to prevent VBV underflow:

if $(TB^{(i)} > U\_bound)$ then $TB^{(i)} = U\_bound$

The target bit budget $TB^{(i)}$ is then sent to the parameter updater 340 and the picture coder 350.

The picture coder 350 receives the picture data and the macroblock mode and motion vectors for each MB from the motion estimation unit 310 through line 312. To optimize the picture quality as much as possible, the picture coder 350 determines quantization step sizes to be used to encode each MB of the current picture $P^{(i)}$ depending on the target bit budget $TB^{(i)}$. Based on these data, the picture coder 350 starts to encode the picture $P^{(i)}$ and outputs coded data CD. Finally, taking the average of the quantization step sizes and calculating the actual consumed bits $UB^{(i)}$ after encoding the picture $P^{(i)}$, the picture coder 350 reports the $UB^{(i)}$ and the average quantization step size $AQ^{(i)}$ of the current picture to the parameter updater 340.

The parameter updater 340 accumulates the mismatch between the target bit budget $TB^{(i)}$ and the actual consumed bits $UB^{(i)}$ for the picture $P^{(i)}$ to produce the excess bits EB after encoding the picture $P^{(i)}$ as:

$EB = EB \times (1-AR) + UB^{(i)} - TB^{(i)}$ where AR is the predefined amortization rate. The relationship between the total activity and the actual complexity measure, $ACR^{(i)}$, is obtained by:

$$ACR^{(i)} = \frac{A^{(i)}}{AQ^{(i)} \times UB^{(i)}}$$

The $ACR^{(i)}$, in turn, is used to predict the complexity measure for a next picture of the same type. To protect the $ACR^{(i)}$ from the effects of a noisy picture, linear combination of the $ACR^{(i)}$ and $ACR^{(i-1)}$ may be utilized in the preferred embodiment. For instance:

if (I-picture)

$ACR_I^{(i)} = ACR_I^{(i-1)} \times (1-CW) + ACR^{(i)} \times CW$ else if (P-picture)

$ACR_P^{(i)} = ACR_P^{(i-1)} \times (1-CW) + ACR^{(i)} \times CW$ else if (B-picture)

$ACR_B^{(i)} = ACR_B^{(i-1)} \times (1-CW) + ACR^{(i)} \times CW$ where CW is the predefined weighting factor for the linear combination. The updated $ACR_I^{(i)}$, $ACR_P^{(i)}$ or $ACR_B^{(i)}$ should be sent to the complexity estimator 320 so as to estimate the complexity measure for next picture of the appropriate type. In addition, the excess bits EB are sent to the target allocator 330 for bit allocation.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for rate control in moving picture video compression comprising the steps of:
   calculating a total activity measure for a current picture to be encoded in a set of consecutive pictures of a video sequence;
   estimating a complexity measure of the current picture based on the total activity measure of the current picture and an activity-to-complexity ratio of a previously encoded picture of the same type in the set of consecutive pictures;
   updating an instantaneous complexity measure for the set of consecutive pictures with the estimated complexity measure of the current picture;
   allocating a target bit budget to the current picture depending on the estimated complexity measure and the instantaneous complexity measure, wherein the allocated target bit budget is inversely proportional to the instantaneous complexity measure;
   encoding the current picture in the video sequence based on the target bit budget; and
   after encoding the current picture, computing the activity-to-complexity ratio for the current picture based on the total activity measure, actual bits consumed by the current picture and the average quantization step size of the current picture;
   wherein the activity-to-complexity ratio of the current picture varies directly with the total activity measure and inversely with the actual consumed bits and the average quantization step size of the current picture.

2. The method as recited in claim 1 wherein the total activity measure of the current picture is calculated during motion estimation for the current picture.

3. The method as recited in claim 1 wherein the allocated target bit budget is proportional to the complexity measure of the current picture.

4. The method as recited in claim 1, wherein the step of estimating complexity is performed by computing the complexity measure using the equation:

$$C_{est} = K \times \frac{A}{ACR}$$

where $C_{est}$ is the estimated complexity measure of the current picture, K is a predefined weighting factor ranging from 0~1, A is the total activity measure of the current picture in the set of consecutive pictures, and ACR is the activity-to-complexity ratio of the previously encoded picture of the same type in the set of consecutive pictures.

5. The method as recited in claim 1 wherein the set of consecutive pictures comprises at least a group of pictures (GOP) compliant with the MPEG video standards.

6. An apparatus for rate control in a moving picture video encoder, comprising:
- a motion estimation unit receiving a current picture to be encoded in a set of consecutive pictures of a video sequence, for calculating a total activity measure for the current picture to be encoded while performing block matching for motion estimation;
- a complexity estimator for estimating a complexity measure of the current picture based on the total activity measure of the current picture and an activity-to-complexity ratio of a previously encoded picture of the same type in the set of consecutive pictures;
- a target allocator updating an instantaneous complexity measure for the set of consecutive pictures with the estimated complexity measure of the current picture, for allocating a target bit budget to the current picture depending on the estimated complexity measure and the instantaneous complexity measure, wherein the allocated target bit budget is inversely proportional to the instantaneous complexity measure; and
- a parameter updater for computing the activity-to-complexity ratio for the current picture based on the total activity measure, actual bits consumed by the current picture and the average of quantization step sizes for the current picture,
- wherein the activity-to-complexity ratio of the current picture varies directly with the total activity measure and inversely with the actual consumed bits and the average of the quantization step sizes of the current picture.

7. The apparatus as recited in claim 6 further comprising a picture coder determining the quantization step sizes to be used to encode each spatial region of the current picture depending on the target bit budget for the current picture, for encoding the current picture in accordance with the quantization step sizes and returning the actual consumed bits of the current picture and the average of the quantization step sizes to the parameter updater.

8. The apparatus as recited in claim 6 wherein the allocated target bit budget is proportional to the complexity measure of the current picture.

9. The apparatus as recited in claim 6, wherein the complexity estimator obtains the complexity measure of the current picture by using the equation:

$$C_{est} = K \times \frac{A}{ACR}$$

where $C_{est}$ is the estimated complexity measure of the current picture, K is a predefined weighting factor ranging from 0~1, A is the total activity measure of the current picture in the set of consecutive pictures, and ACR is the activity-to-complexity ratio of the previously encoded picture of the same type in the set of consecutive pictures.

10. The apparatus as recited in claim 6 wherein the set of consecutive pictures comprises at least a group of pictures (GOP) compliant with the MPEG video standards.

11. The apparatus as recited in claim 7 wherein the spatial region of the current picture is a macroblock as defined in the MPEG video standards.

* * * * *